United States Patent [19]

Moore

[11] Patent Number: 4,920,612
[45] Date of Patent: May 1, 1990

[54] FISH FILLET KNIFE

[76] Inventor: George A. Moore, 1508 Deane Blvd., Racine, Wis. 53405

[21] Appl. No.: 361,426

[22] Filed: Jun. 5, 1989

[51] Int. Cl.$^5$ ............................................. A22C 25/16
[52] U.S. Cl. ...................................... 17/56; 17/66; 17/46; 30/353
[58] Field of Search ................ 17/66, 56, 46; 30/353, 30/355, 356, 357

[56] References Cited

U.S. PATENT DOCUMENTS

| | | | |
|---|---|---|---|
| 75,255 | 3/1868 | Fenton | 30/353 |
| 1,646,166 | 10/1927 | Newton | 30/353 |
| 1,748,637 | 2/1930 | Crum | 30/353 |
| 2,102,930 | 12/1937 | Wharton | 30/353 |
| 2,706,831 | 4/1955 | Strefling | 30/353 |
| 3,033,251 | 5/1962 | Atkinson et al. | 30/353 |
| 3,353,207 | 11/1967 | Weinberger | 17/72 |
| 4,574,431 | 3/1986 | Colling | 17/66 |
| 4,592,113 | 6/1986 | Selfors | 17/66 |
| 4,704,769 | 11/1987 | Hanechak et al. | 17/56 |

*Primary Examiner*—Willis Little
*Attorney, Agent, or Firm*—Peter N. Jansson

[57] ABSTRACT

A knife for filleting fish includes a generally flat cutting blade disposed in a first plane and having a proximal end and a distal end. A generally flat boning blade is disposed in a second plane and has a proximal end, a distal end and a cutting edge. The proximal end of the boning blade is attached to the distal end of the cutting blade in a manner such that the first plane of the cutting blade and the second plane of the boning blade are generally normal to one another. A handle is attached to the proximal end of the cutting blade and the knife thereby permits cutting of a fish along either of two cutting axes without substantially changing the orientation of the knife with respect to the fish.

Several embodiments are disclosed.

19 Claims, 3 Drawing Sheets

FISH FILLET KNIFE

FIELD OF THE INVENTION

This invention is related generally to cutting instruments and, more particularly, to a knife for filleting whole fish.

BACKGROUND OF THE INVENTION

Whole fish are usually filleted for cooking by using a long bladed filleting knife having a handle and cutting blade conventionally formed and arranged with respect to one another. In the alternative, sportsmen in the wild may also use short bladed hunting knives with relatively thick rigid blades. One of the primary disadvantages of cutting instruments of these types is that when they are used in the filleting process, especially for panfish having differing skeletal structures, it requires that the hand of the user be virtually touching the horizontal surface upon which the fish is placed for filleting. For smaller, flat boned pan fish such as bass, crappies, blue gills, walleye and the like, the combined thickness of the users hand and the knife handle will not permit the blade to be positioned generally parallel to the fish backbone and to the surface upon which the fish is placed. Additionally, knives of the aforedescribed type are ergonomically arranged so that the human arm and hand are most comfortable when gripping the handle and urging the blade in a cutting motion away from the body of the user. Use in other knife orientations may require re-orienting the manner of grasping the handle to one which is awkward and, perhaps, less safe. In particular, such knives tend to cause the user to experience arm and wrist discomfort if employed for long periods for fish filleting since the primary cutting motion is laterally side to side rather than downward.

In addition, conventional knives have generally linear, uninterrupted (i.e., non-serrated) cutting edges which have proven to be less than fully satisfactory for tactile sensing of the precise location of fish rib and back bones. As is known to those skilled in the art, the ability to sense the structure of the fish by tactile means when performing the filleting process is important in terms of both rapidity of preparation and preservation of edible tissue.

With knives of the aforedescribed type, it is common to find them equipped with handles made of wood or other composition materials which may tend to deteriorate over time and which, in any event, are more apt to retain odors or small bits of tissue than would be a handle made of a steel material. In addition, knives of the aforedescribed type almost universally include a blade and a handle, the orientation of which may not be modified, one with respect to the other. The manufacture of such conventional knives also involves several steps including the procuring and forming of the handle material and the attachment of the finished handle to the cutting blade. In addition, the arrangement of conventional knives necessarily requires that the user's hand be located adjacent the fish in a horizontal, spaced relation therefrom rather than directly over the work area, the latter being preferred for accuracy and ease of preparation.

OBJECTS OF THE INVENTION

It is an object of this invention to overcome the disadvantages of the prior art including those which are noted above.

Another object of this invention is to provide a filleting knife which is optimally ergonomically designed for the human arm, wrist and hand when filleting fish.

Still another object of this invention is to provide a knife which may be made entirely of a steel material.

Yet another object of this invention is to provide a filleting knife which includes a boning blade especially suitable for tactile sensing of the bone anatomy of a fish to be filleted.

Still another object of this invention is to provide a filleting knife wherein the user's hand may be located well above the surface upon which the fish is placed and generally directly above the fish to be filleted, thereby resulting in more precise control and quicker and more rapid preparation of the fish.

How these and other important objects are accomplished will be apparent from the following description taken in conjunction with the drawing.

SUMMARY OF THE INVENTION

A knife for filleting fish includes a generally flat cutting blade disposed in a first plane and having a proximal end and a distal end. A generally flat boning blade is disposed in a second plane and has a proximal end, a distal end and a cutting edge. The proximal end of the boning blade is attached to the distal end of the cutting blade in a manner such that the first plane of the cutting blade and the second plane of the boning blade are generally normal to one another. A handle is attached to the proximal end of the cutting blade and the knife thereby permits cutting of a fish along either of two cutting axes without substantially changing the orientation of the knife with respect to the fish.

More particularly, a generally flat cutting blade is disposed in a first plane, has proximal and distal ends and a first longitudinal axis. In a preferred embodiment, the cutting edge will have a generally linear cutting edge. Other preferred embodiments include a pair of sharpened, oppositely disposed cutting edges to facilitate cutting in a leftward or rightward direction with equal ease. Still other embodiments include one or two serrated cutting segments adjacent the distal end of the blade. The blade may be of uniform width or may have a tapering width, diminishing from the proximal to the distal end.

A boning blade is generally flat, has a proximal end, a distal end and a cutting edge and is attached to the distal end of the cutting blade. The boning blade is disposed in a second plane which is generally normal to the first plane of the cutting blade. The boning blade has a second longitudinal axis, the first longitudinal axis of the cutting blade and the second longitudinal axis of the boning blade defining an acute included angle therebetween. The boning blade includes a cutting edge which, in a highly preferred embodiment, is serrated for better tactile sensing of the location of fish rib and backbone structure.

In one preferred embodiment, a handle is generally flat as viewed in a first direction and has an edge as viewed in a second direction. The edge is disposed along a handle axis and the handle is attached to the proximal end of the cutting blade in such a manner that the handle axis and the first plane define an acute included angle. In one preferred embodiment, the handle and the cutting blade are formed of a single piece of material such as resilient stainless steel. The handle may include a thumb rest segment and may further include surface checkering, cross hatching or finger contours for more firm gripping.

In another preferred embodiment, the handle is formed as a gripping member which has a third longitudinal axis and is attached to the cutting blade by fasteners so that the third longitudinal axis is generally parallel to the first longitudinal axis of the cutting blade. This gripping member is preferably formed of a material other than a steel material. In any embodiment of the inventive knife, the first downward filleting stroke, which severs rib cage segments, and the subsequent lateral strokes, which separate meat tissue from the central fish backbone, may both be made without substantially changing the orientation of the knife with respect to the fish or without substantially changing the relative orientation of the hand and the wrist.

DETAILED DESCRIPTION OF PREFERRED EMBODIMENTS

Figure 1:
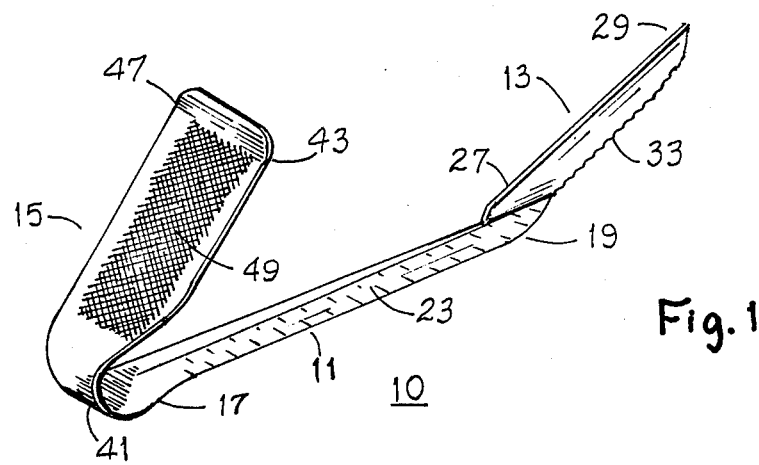
FIG. 1 is a perspective view of a first embodiment of the inventive knife.
Figure 2:
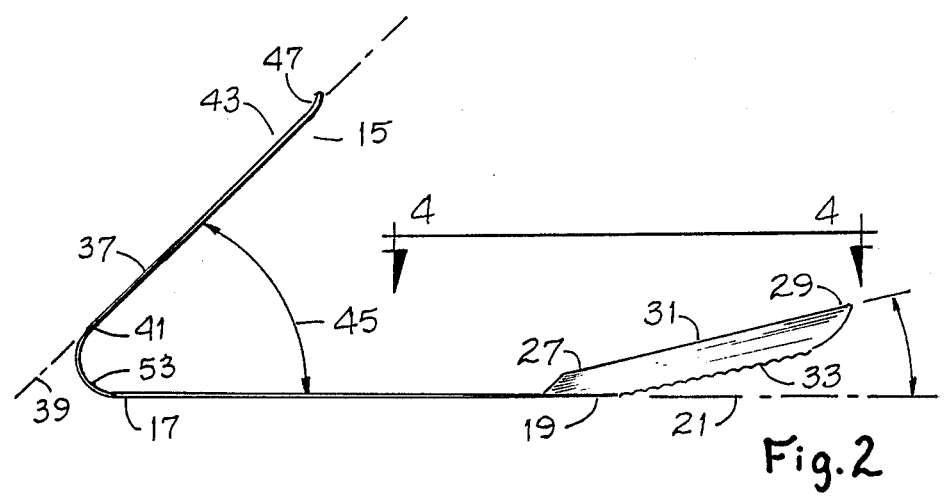
FIG. 2 is a side elevation view of the knife of FIG. 1.
Figure 3:
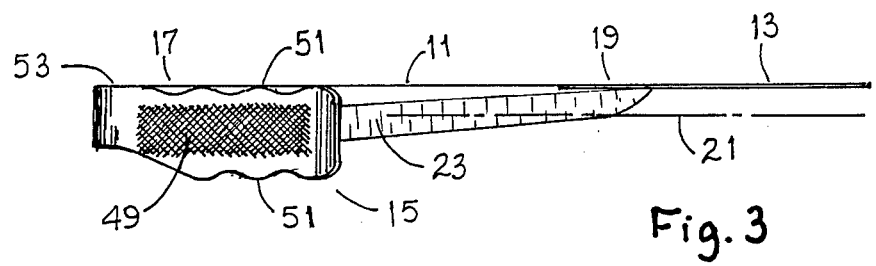
FIG. 3 is a top plan view of another embodiment of the knife of FIG. 1.

Referring first to FIGS. 1, 2 and 3, a highly preferred embodiment of the inventive knife 10 is shown to include a cutting blade 11 for separating meat from the backbone of a whole fish and a boning blade 13 which is attached to the cutting blade 11 for making initial cuts in the rib area and permitting the tactile detection of rib location. A handle 15 is connected to the cutting blade 11 in a fashion to position the hand generally above and closely adjacent the fish to be filleted.

More particularly, the cutting blade 11 is a generally flat and arranged in a first plane which, when the knife is in use, may be oriented generally parallel to the horizontal surface upon which the fish is placed. The cutting blade 11 has a proximal end 17, and a distal end 19, and a first longitudinal axis 21 extending between the ends 17, 19. A sharpened, hollow ground cutting edge 23 extends along one side of the blade 11 and is generally linear as with conventional blades. As best seen in FIG. 3, the blade 11 is slightly tapered, diminishing in width from its proximal end 17 to its distal end 19.

In another preferred embodiment which equally facilitates use of the knife by left handed or right handed users, the cutting blade will have a second cutting edge (not shown) so that cutting movement of the knife, upward or downward as viewed in FIG. 3, will be effective for filleting fish.

Figure 4:
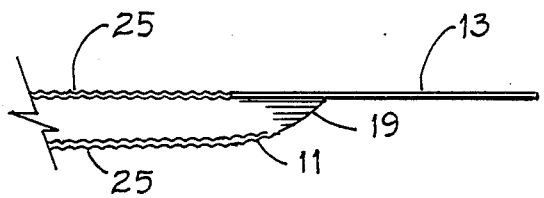
FIG. 4 is a top plan view of the distal end of the cutting blade and of the boning blade taken along the viewing plane of 4—4 of FIG. 3, with parts broken away, to show an alternate embodiment of the cutting blade.

Referring to FIGS. 1 and 4 and in another preferred embodiment, the cutting blade 11 will include either one or two serrated segments 25 disposed adjacent the distal end. Such segments 25 will be particularly useful for separating the skeletal structures of larger fish.

Referring again to FIGS. 1, 2 and 3 the knife also includes a boning blade 13 which is generally flat and disposed in a second plane generally normal to the first plane. The boning blade 13 has a proximal end 27, a distal end 29, a second longitudinal axis 31 extending therebetween and a cutting edge 33. In a highly preferred embodiment, the cutting edge 33 is serrated for providing better tactile detection of the location of fish rib structure. The proximal end 27 of the boning blade 13 is attached to the distal end 19 of the cutting blade 11 and extends upwardly, outwardly therefrom as viewed from the handle 15. The axes 21, 31 thereby define an included acute angle 35 which in a preferred embodiment is from 5° to 7°. Mounting of the boning blade 13 in that fashion permits the blade 13 to be readily used for the initial filleting cut as described below while yet placing it in an unobstructing location during those times when the cutting blade 11 is used for meat separation. In a highly preferred embodiment, attachment of the boning blade 13 to the cutting blade 11 is by brazing but in the alternative, these blades 11, 13 may be made of a single piece of material.

Referring to FIGS. 1, 2 and 3, the knife 10 also includes a handle 15 which, in a highly preferred embodiment, is generally flat as viewed in a first direction of FIG. 3 but projects a generally straight edge 37 when viewed in a second direction as in FIG. 2. The edge 37 is generally disposed along a handle axis 39 and the proximal end 41 of the handle 15 is attached to the proximal end 17 of the cutting blade 11 while the distal end 43 of the handle 15 extends upwardly and forwardly from the point of attachment as viewed in FIG. 1. The handle axis 39 and the first longitudinal axis 21 define an acute angle 45 therebetween which in a preferred embodiment is in the range of 40° to 50°. When constructed and arranged in this manner, the handle 15 will be disposed generally above the cutting blade 11 and in a spaced relation thereto when the knife 10 is being used for filleting a fish. In another embodiment, the handle 15 may include an upwardly curved thumb rest 47 and, as shown in FIG. 3, may optionally include surface cross-scoring 49 and/or slightly scalloped edges 51 for providing a better grip.

In a highly preferred embodiment, the handle 15 and the cutting blade 11 will be formed of a single piece of stainless steel material such as high carbon 440A or X50CrMoV15 while in another highly preferred embodiment the entire knife 10 may be formed of a single piece of such material. As seen in FIG. 2, the thickness of the initial steel stock from which a preferred knife is fabricated should be selected to provide sufficient rigidity for good knife control while yet providing a certain amount of resilient bending at the junction 53 of the handle 15 and the cutting blade 11. Construction in this manner will permit better control of downward force and will result in close control of the separation of the meat from the fish backbone. It is also apparent from the Figures that when the knife 10 is in use, the hand of the user will be located well above the horizontal surface upon which the fish is placed and superior control of the attack angle of the cutting blade 11 will result. This is especially important when filleting smaller fish.

Figure 5:
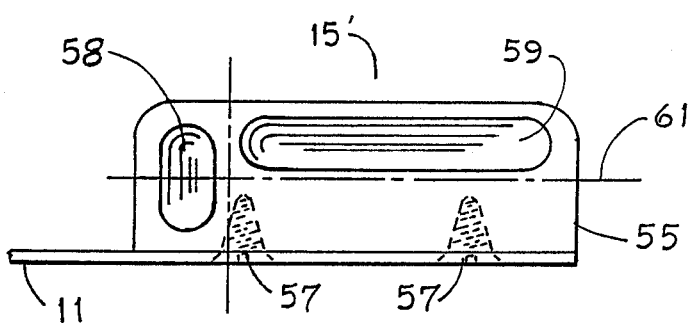
FIG. 5 is a side elevation view of another embodiment of the inventive knife with parts broken away, showing yet another optional handle structure employing a gripping member.

Referring next to FIG. 5, a second embodiment of the inventive knife is shown to include an optional handle 15[1] embodied as a gripping member 55 which may be attached to the cutting blade 11 by fasteners 57 such as rivets, screws or by bonding. The gripping member 55 defines a generally rectangular shape, has a thickness (not shown) which is approximately that of the cutting blade 11 at its proximal end 17 and includes a front gripping recess 58 which may be securely grasped by the thumb and index finger when the knife 10 is used. Each side of the gripping member 55 includes an indented groove 59 formed therein for accommodating the hand, palm and the fingers for better gripping. It will be noted that in the embodiment of FIG. 5, as with those of FIGS. 1-3, the hand grips the knife 10 along an axis 39 or 61 which is non-coincident with the first longitudinal axis 21 of the cutting blade 11. This is one of the features which distinguishes the inventive knife 10 from other conventional knives used for filleting fish.

Figure 6:
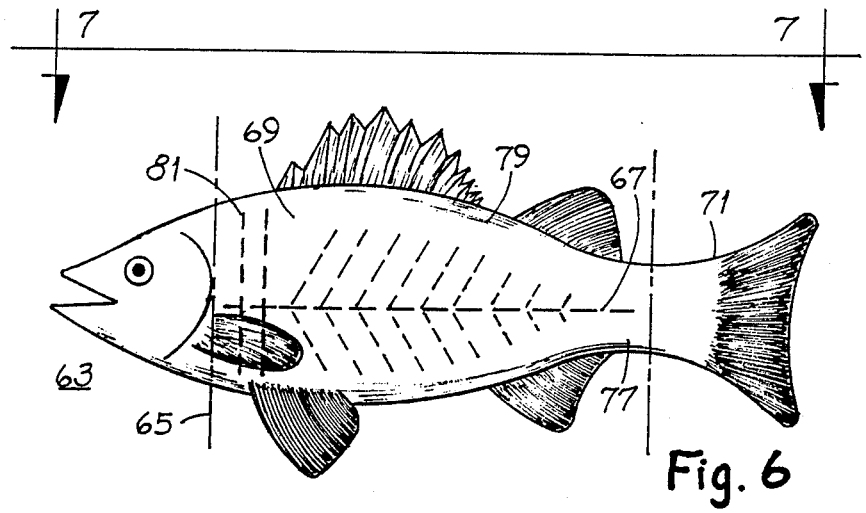
FIG. 6 shows a top plan view of a whole fish disposed on a horizontal surface in a position for filleting and with certain bone structures in phantom.
Figure 7:
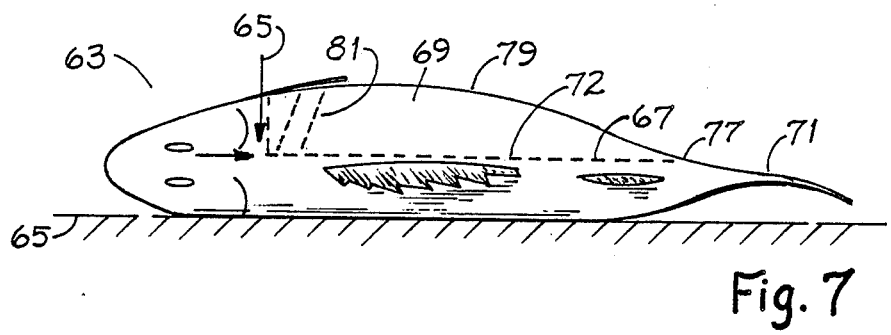
FIG. 7 is a side elevation view of the fish of FIG. 6 taken along the viewing plane 7—7 with portions of the rib and backbone structure shown in phantom.
Figure 8:
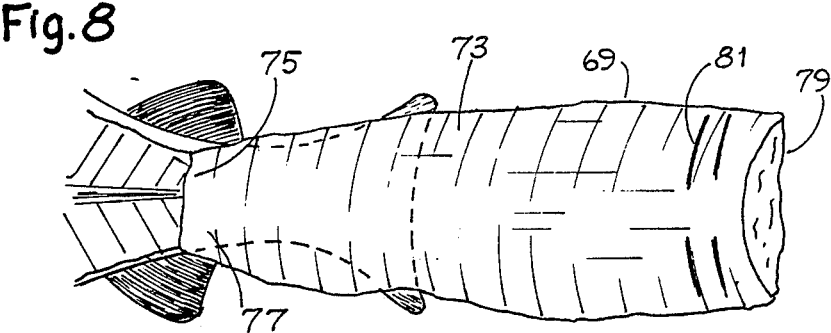
FIG. 8 shows a fish, in a partially filleted condition with parts broken away and other parts shown in phantom.

Referring now to all Figures and especially to FIGS. 6, 7 and 8, a fish 63 to be filleted is placed upon a horizontal surface 65 as oriented for a right handed user of the knife 10. In the initial operation, the boning blade 13 is used to make a cut just to the right of the gill along plane 65, using an up and down motion as viewed in FIG. 6. The user will not only detect the fish backbone 67 by touch but may also hear an audible indication that the boning blade 11 has reached the backbone 67. Thereupon, the user urges the handle 15 upward so that the cutting blade 11 may come to engagement with the edible part 69 of the meat to be filleted. Using slight downward pressure, the cutting blade 11 is moved upward and downward as viewed in FIG. 6 (laterally sideways in actual practice) while being steadily urged toward the tail 71 of the fish 63 along the plane 72 and the filet 73 is thereby removed. The process may be repeated for the other side of the fish 63. An alternative approach is shown in FIG. 8 which would terminate the first cutting operation with the cutting blade 11 at a point 75 near the tail 71 where the outer skin is still connected to the tail 71. Irrespective of whether the partially-removed filet 73 is totally separated from the fish carcass or is left temporarily connected thereto by a tab of skin, the filet 73 is then grasped near its tail end 77 and the cutting blade 11 moved to engage the filet 73 at the interface between the edible part 65 and the scale-bearing skin 79. Using a smooth motion of the cutting blade 11, the skin 79 may be neatly and cleanly severed from the fillet 73. As the last step, any rib bones 81 which remain at the forward part of the filet 73 can be tactilely detected with the fingers. When the bone tips are located, the edge of the cutting blade 11 is placed just beneath these tips and a slight back and forth cutting motion will lift the bones 81, leaving an essentially boneless filet 73 of fish.

It will be appreciated from the foregoing that the entire fish 63 can be filleted without substantial changes in the relative orientation of the hand and the wrist on the one hand and the fish 63 on the other. That is, the knife 10 is used throughout the process in a manner such that the second longitudinal plane defined by the boning blade 13 will be maintained substantially normal to the horizontal cutting surface 65 upon which the fish 63 is placed.

Referring additionally to FIG. 7, it is also to be appreciated that if the knife 10 is embodied to have one or two serrated edges 25 along the distal end 19 of the cutting blade 11, these will be particularly useful in severing rib bones 81 on larger fish. It will also be appreciated that the operation of the knife 10 has been shown in connection with a fish 63 oriented in FIGS. 6-8 for filleting by a right handed person. A knife 10 having dual cutting edges 23 and or 25 as described above would facilitate the filleting of fish by either right handed or left handed persons.

While the principles of this invention have been described in connection with specific embodiments, it should be understood clearly that these descriptions are made only by way of example and are not intended to limit the scope of the invention.

I claim:
1. A knife for filleting fish including:
 a generally flat cutting blade disposed in a first plane and having a proximal, end and a distal end;
 a generally flat boning blade disposed in a second plane and having a proximal end, a distal end and a cutting edge, said proximal end of said boning blade being attached to said distal end of said cutting blade in a manner such that said first plane and said second plane are generally normal one to the other;
 a handle attached to said proximal end of said cutting blade, said knife thereby permitting cutting of said fish along either of two cutting axes without substantially changing the orientation of said knife with respect to said fish.

2. The knife of claim 1 wherein said cutting blade has a first longitudinal axis, said boning blade has a second longitudinal axis and said first and second longitudinal axes define an acute included angle therebetween.

3. The knife of claim 2 wherein said cutting edge of said boning blade is embodied as a generally linear cutting edge.

4. The knife of claim 2 wherein said cutting edge of said boning blade is embodied as a serrated cutting edge.

5. The knife of claim 3 wherein said cutting blade includes a single sharpened edge.

6. The knife of claim 2 wherein said cutting blade includes two sharpened cutting edges.

7. A knife especially suitable for filleting fish including:
 a generally flat cutting blade disposed in a first plane and have a proximal end and a distal end;
 a generally flat boning blade disposed in a second plane and having a proximal end, a distal end and a cutting edge, said proximal end of said boning blade being attached to said distal end of said cutting blade in a manner such that said first plane and said second plane are generally normal one to the other;
 a handle attached to said proximal end of said cutting blade, said handle being generally flat as viewed in a first direction, said handle having a generally straight edge as viewed in a second direction, said edge being generally disposed along a handle axis, said handle, said cutting blade and said boning blade cooperating to permitting filleting of a fish without substantially changing the orientation of said knife with respect to said fish.

8. The knife of claim 7 wherein said handle axis and said first plane define an acute angle therebetween, said handle being disposed generally above said cutting blade and in a spaced relation thereto when said knife is being used for filleting a fish.

9. The knife of claim 8 wherein said cutting blade includes a generally linear cutting edge and said boning blade includes a serrated cutting edge.

10. The knife of claim 9 wherein said cutting blade includes two generally linear cutting edges.

11. The knife of claim 9 wherein said cutting blade further includes a serrated cutting segment.

12. The knife of claim 8 wherein said boning blade and said cutting blade are formed of a single piece of steel material.

13. The knife of claim 8 wherein said handle, said cutting blade and said boning blade are formed of a single piece of steel material.

14. A knife for filleting fish including:
a generally flat cutting blade disposed in a first plane and have a proximal end and a distal end, said cutting blade having a generally linear cutting edge;
a generally flat boning blade disposed in a second plane and having a proximal end, a distal end and a cutting edge, said proximal end of said boning blade being connected to said distal end of said cutting blade in a manner such that said first plane and said second plane are generally normal one to the other, said boning blade having a serrated cutting edge;
said cutting blade having a first longitudinal axis, said boning blade having a second longitudinal axis, said first and second axes defining an acute included angle therebetween, said blades being formed of a resilient steel material;
a handle attached to said proximal end of said cutting blade in a manner to permit filleting of said fish without substantially changing the orientation of said knife with respect to said fish.

15. The knife of claim 14 wherein said handle is formed of said resilient steel material and is generally flat as viewed in a first direction, said handle having a generally straight edge as viewed in a second direction, said edge being generally disposed along a handle axis, said handle axis and said first longitudinal axis defining an acute included angle therebetween.

16. The knife of claim 15 wherein said edge of said handle is of generally uniform thickness and said cutting blade has a tapering width, said width diminishing from said proximal end to said distal end of said cutting blade.

17. The knife of claim 16 wherein said handle includes an enlarged thumb rest section.

18. The knife of claim 14 wherein said handle is embodied as a gripping member, said gripping member having a third longitudinal axis and being attached to said cutting blade by fasteners whereby said third longitudinal axis is generally parallel to and non-coincident with said first longitudinal axis of said cutting blade.

19. The knife of claim 18 wherein said gripping member is formed of a material other than a steel material.

* * * * *